(12) United States Patent
Maruyama et al.

(10) Patent No.: US 9,024,614 B2
(45) Date of Patent: May 5, 2015

(54) POWER SUPPLY DEVICE PERFORMING VOLTAGE CONVERSION

(71) Applicants: Tsuyoshi Maruyama, Nagoya (JP); Katsumi Inukai, Iwakura (JP)

(72) Inventors: Tsuyoshi Maruyama, Nagoya (JP); Katsumi Inukai, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 89 days.

(21) Appl. No.: 13/728,500

(22) Filed: Dec. 27, 2012

(65) Prior Publication Data

US 2013/0170850 A1  Jul. 4, 2013

(30) Foreign Application Priority Data

Dec. 28, 2011  (JP) .................................. 2011-289338

(51) Int. Cl.
| | |
|---|---|
| B23K 11/24 | (2006.01) |
| H02M 3/335 | (2006.01) |
| G03G 15/00 | (2006.01) |

(52) U.S. Cl.
CPC ........... *H02M 3/33507* (2013.01); *G03G 15/80* (2013.01); *G03G 15/5004* (2013.01); *Y10S 323/901* (2013.01)

(58) Field of Classification Search
CPC .............. G03G 15/80; G03G 15/5004; H02M 3/33507
USPC ............ 399/16, 31, 36, 37, 75–78, 85, 88–90
See application file for complete search history.

(56) References Cited

U.S. PATENT DOCUMENTS

| | | | |
|---|---|---|---|
| 7,623,361 B2* | 11/2009 | Basso et al. ..................... | 363/49 |
| 2009/0317103 A1 | 12/2009 | Furukawa et al. | |
| 2011/0080599 A1* | 4/2011 | Katahira ........................ | 358/1.8 |

(Continued)

FOREIGN PATENT DOCUMENTS

| | | |
|---|---|---|
| JP | H10-201230 A | 7/1998 |
| JP | 2004-122659 A | 4/2004 |

(Continued)

OTHER PUBLICATIONS

Sultana, Nadira; Graves, Chris, Texas Instruments Solution for Undershoot Protection for Bus Switches (PDF 68 KB) Apr. 13, 2000, Texas Instruments.*

(Continued)

*Primary Examiner* — Walter L Lindsay, Jr.
*Assistant Examiner* — Jessica L Eley
(74) *Attorney, Agent, or Firm* — Scully, Scott, Murphy & Presser, PC

(57) ABSTRACT

In a power supply device, the controller outputs a control signal specifying a voltage value. The voltage conversion unit converts a first voltage to a second voltage in response to a control signal specifying a voltage value output from the controller. The voltage conversion unit converts the first voltage to a start voltage, as the second voltage, in response to a first control signal specifying a start voltage value output from the controller and further converts the first voltage to a target voltage, as the second voltage, in response to a second control signal specifying a target voltage value output from the controller. A transition period of time is intervened between generation of the start voltage and generation of the target voltage during which the controller outputs a third control signal specifying the intermediate voltage value between the start voltage value and the target voltage value.

8 Claims, 8 Drawing Sheets

(56) References Cited

U.S. PATENT DOCUMENTS

2011/0170885 A1* 7/2011 Cho et al. .................. 399/37
2012/0110355 A1 5/2012 Ohashi et al.

FOREIGN PATENT DOCUMENTS

| JP | 2004-144999 A | 5/2004 |
| JP | 2004-191523 A | 7/2004 |
| JP | 2006-163016 A | 6/2006 |
| JP | 2007-047368 A | 2/2007 |
| JP | 2009-240006 A | 10/2009 |
| JP | 2010-2744 A | 1/2010 |
| JP | 2011-97792 A | 5/2011 |
| WO | 2010/143605 A1 | 12/2010 |

OTHER PUBLICATIONS

Japanese Office Action dated Mar. 3, 2015 from related Japanese Application No. 2011-289338, together with a partial English language translation.

* cited by examiner

POWER SUPPLY DEVICE PERFORMING VOLTAGE CONVERSION

CROSS REFERENCE TO RELATED APPLICATION

This application claims priority from Japanese Patent Application No. 2011-289338 filed Dec. 28, 2011. The entire content of the priority application is incorporated herein by reference.

TECHNICAL FIELD

The present invention relates to a power supply for an image-forming device that varies an output voltage among a plurality of voltage values.

BACKGROUND

There are known in the art power-supplying devices capable of varying an output voltage among a plurality of values. One such conventional power supply changes the value of its output voltage by switching the ON/OFF state of a switching element connected to resistors in parallel or in series.

SUMMARY

However, when the output voltage can only be switched between two values corresponding to the ON and OFF states of the switching element, undershoot in the output voltage can occur when changing from an ON voltage to an OFF voltage lower than the ON voltage, for example. Similarly, overshoot in the output voltage can occur when switching from the OFF voltage to the higher ON voltage.

In view of the foregoing, it is an object of the present invention to provide a power supply for varying the output voltage among a plurality of values that is capable of suppressing the occurrence of undershoot and overshoot.

In order to attain the above and other objects, the invention provides a power supply device. The power supply device includes a first voltage generating unit, a controller, and a voltage conversion unit. The first voltage generating unit is configured to generate a first voltage. The controller is configured to output a control signal specifying a voltage value. The voltage conversion unit is configured to convert the first voltage to a second voltage in response to a control signal specifying a voltage value output from the controller, and output the second voltage. The voltage conversion unit converts the first voltage to a start voltage, as the second voltage, in response to a first control signal specifying a start voltage value output from the controller and further converts the first voltage to a target voltage, as the second voltage, in response to a second control signal specifying a target voltage value output from the controller. A transition period of time is intervened between generation of the start voltage and generation of the target voltage during which the controller outputs a third control signal specifying the intermediate voltage value between the start voltage value and the target voltage value.

According to another aspect, the present invention provides an image forming device. The image forming device includes a power supply described above, and an image forming unit configured to perform an image forming process. An operation mode of the image forming device is switched from among a sleep mode, a print mode, and a ready mode in response to the control signal. In the print mode, the image forming unit performs the image forming process and the controller sets the start voltage. In the sleep mode, the controller waits for an instruction to perform the image forming process. The transition period of time is put in the ready mode. The controller sequentially switches the operation mode to the print mode, the ready mode, and the sleep mode in said order when the controller receives the instruction to perform the image forming process in the sleep mode.

DETAILED DESCRIPTION

First Embodiment

Next, a first embodiment of the present invention will be described while referring to FIGS. 1 through 5.

1. Mechanical Structure of a Printer

Figure 1:
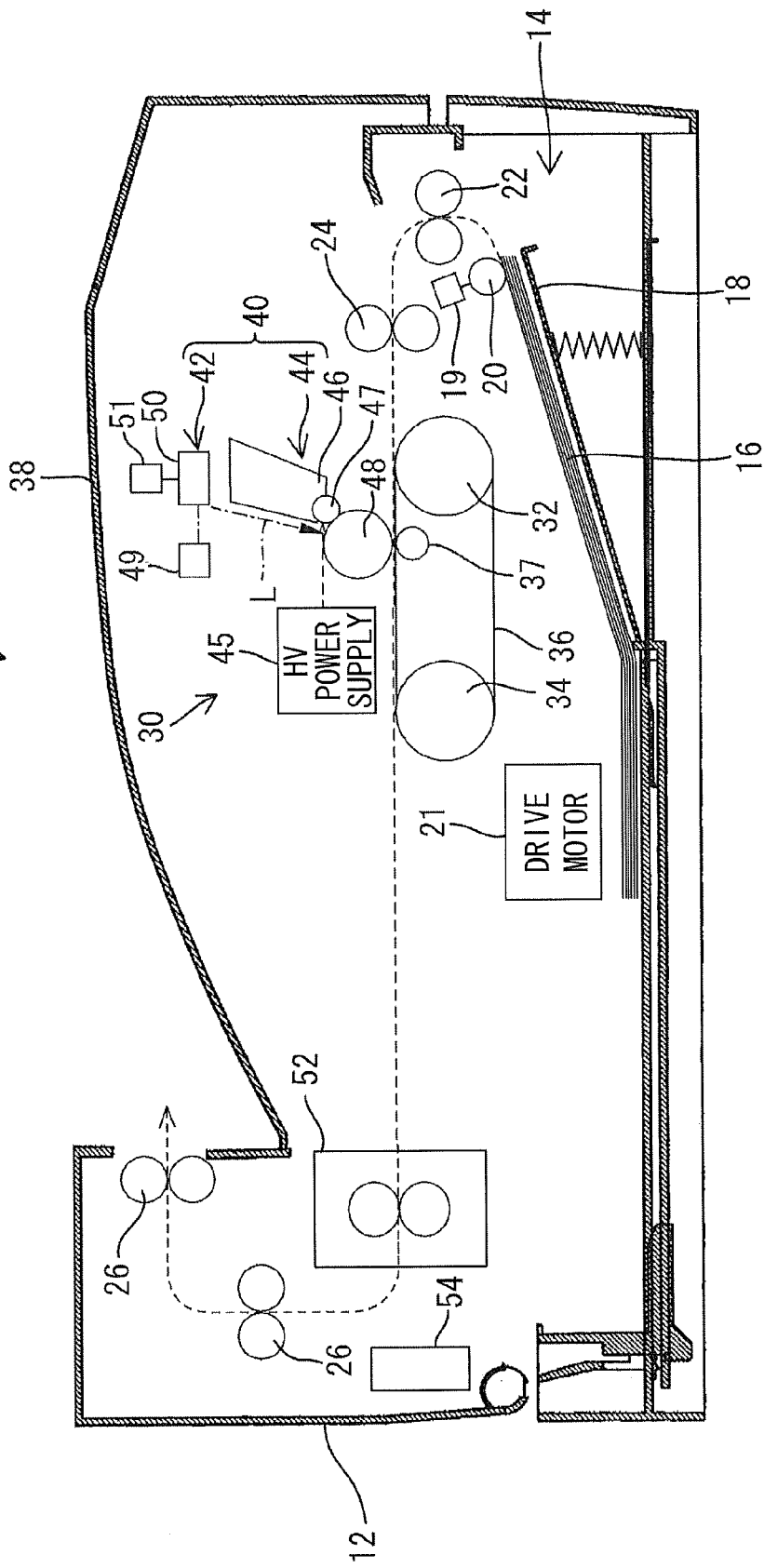
FIG. 1 is a side cross-sectional view showing a general structure of a printer according to a first embodiment.

The printer 10 is an example of the image-forming device according to the present invention. As shown in FIG. 1, the printer 10 is a direct transfer laser printer employing a single color of toner to form monochrome images.

The printer 10 includes a casing 12 constituting the outer shell thereof. A paper tray 14 is provided in the bottom section of the casing 12. Sheets 16 of paper are stacked in the paper tray 14. The paper tray 14 is capable of being pulled out of the casing 12. The user pulls the paper tray 14 out of the casing 12 to load the casing 12 with sheets 16. The printer 10 is also provided with: a pressing plate 18 disposed in the bottom of the paper tray 14; a pickup roller 20 disposed above one end of the paper tray 14; a pair of conveying rollers 22 and a pair of registration rollers 24 disposed downstream of the pickup roller 20; an image-transfer unit 30 disposed downstream of the registration rollers 24 for forming images on the sheets 16; a drive motor 21 for driving the pickup roller 20, the conveying rollers 22, and the registration rollers 24 to rotate; and a solenoid 19 for actuating the drive motor 21.

When the paper tray 14 is accommodated in the casing 12, the pressing plate 18 presses one end of the sheets 16 against the pickup roller 20. When the solenoid 19 is on, the drive force of the drive motor 21 is transmitted to the pickup roller 20, the conveying rollers 22, and the registration rollers 24 for rotating the rollers. When driven to rotate, the pickup roller 20 feeds a sheet 16 to the conveying rollers 22, and the conveying rollers 22 convey the sheet 16 to the registration rollers 24. After correcting skew in the sheet 16, the registration rollers 24 convey the sheet 16 to the image-transfer unit 30.

The image-transfer unit 30 includes a pair of support rollers 32 and 34, a belt 36, and a transfer roller 37. The belt 36 is mounted around the support rollers 32 and 34 and forms a ring-like shape in a side view. The transfer roller 37 is disposed inside the ring-like shape of the belt 36. The drive force of the drive motor 21 drives the support rollers 32 and 34 to rotate counterclockwise in FIG. 1, and the belt 36 circulates along with their rotation.

An image-forming unit 40 is provided above the belt 36. The image-forming unit 40 includes a scanning unit 42, and a process unit 44. The process unit 44 includes a photosensitive drum 48, and a developer cartridge 46. The developer cartridge 46 is filled with toner and is provided with a developing roller 47. A high-voltage power supply 45 applies a developing bias to the developing roller 47 of the developer cartridge 46, enabling the developing roller 47 to supply toner from the developer cartridge 46 onto the photosensitive drum 48.

The scanning unit 42 is disposed above the photosensitive drum 48 of the process unit 44. The scanning unit 42 includes a polygon mirror 50, a motor 51 for rotating the polygon mirror 50, and a light source 49 for irradiating a laser beam L. The image-forming unit 40 rotates the polygon mirror 50 based on image data transmitted from a central processing unit (see FIG. 2; hereinafter "CPU") 80 described later while controlling the light source 49 to irradiate the laser beam L so that the laser beam L reflects off the polygon mirror 50 onto the photosensitive drum 48 to form an electrostatic latent image on the surface of the photosensitive drum 48 that corresponds to the image data. At the same time, the high-voltage power supply 45 applies the developing bias to the developing roller 47, causing toner in the developer cartridge 46 to be supplied to the latent image on the photosensitive drum 48, thereby forming a toner image on the surface of the photosensitive drum 48.

The high-voltage power supply 45 applies a transfer bias to the transfer roller 37 for transferring the toner image from the photosensitive drum 48 onto the sheet 16 as the toner image passes through a transfer position, resulting in an image formed on the sheet 16. The sheet 16 is subsequently conveyed to a fixing unit 52, where the image is fixed to the sheet 16. Subsequently, pairs of conveying rollers 26 disposed downstream of the fixing unit 52 are driven to rotate by the drive motor 21 for conveying the sheet 16 out of the casing 12 and onto a discharge tray 38 provided on the top surface of the casing 12. A fan 54 is disposed near the fixing unit 52. The fan 54 prevents the temperature in the casing 12 from rising too high due to heat generated in the fixing unit 52 in order to prevent toner from caking in the developer cartridge 46.

2. Electrical Structure of the Printer

Figure 2:
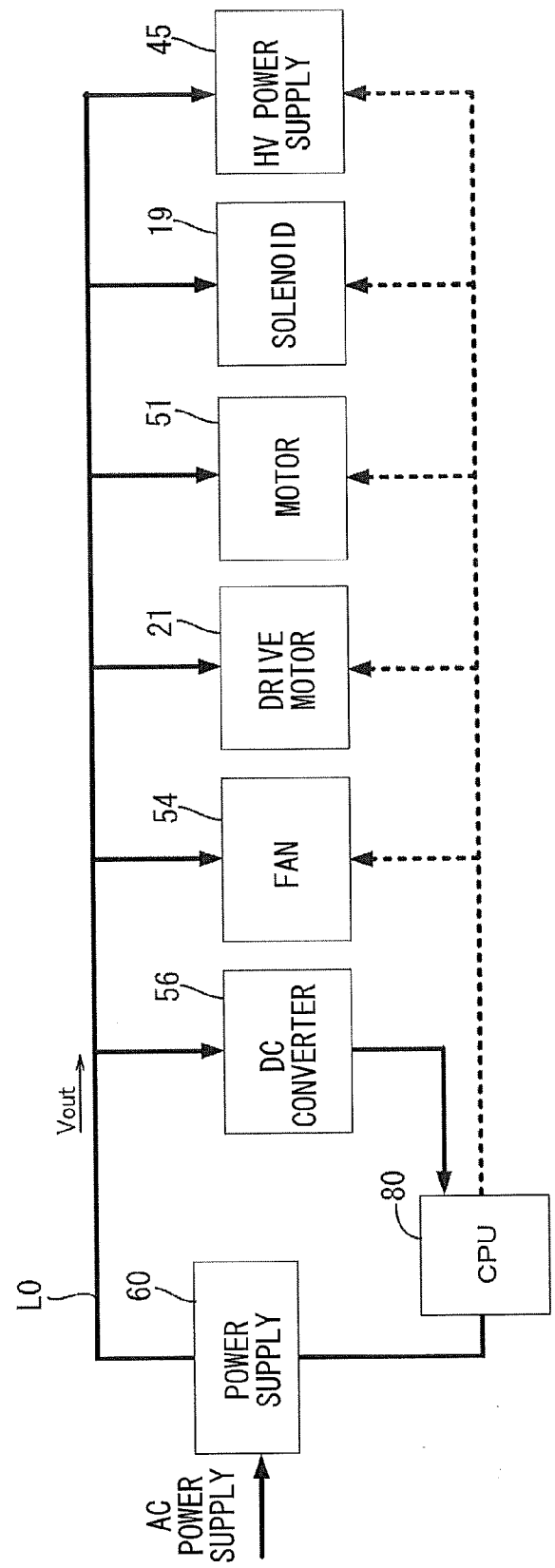
FIG. 2 is a block diagram showing a general electrical structure of the printer.

The printer 10 has a power supply 60. As shown in FIG. 2, the power supply 60 receives an AC voltage from an AC power supply, generates an output voltage $V_{out}$, and outputs the output voltage $V_{out}$ on an output line $L_O$. The output voltage $V_{out}$ is a common DC voltage required by each component in the printer 10, including a DC-DC converter 56, and the fan 54. The DC-DC converter 56 produces 3.3-V power from the voltage generated in the power supply 60 and outputs this voltage to the CPU 80. The power supply 60 is connected to the CPU 80 and, together with the CPU 80, serves as an example of a power supply according to the present invention. In the following description, the power supply 60 will be used to denote both the power supply 60 and the CPU 80.

Figure 3:
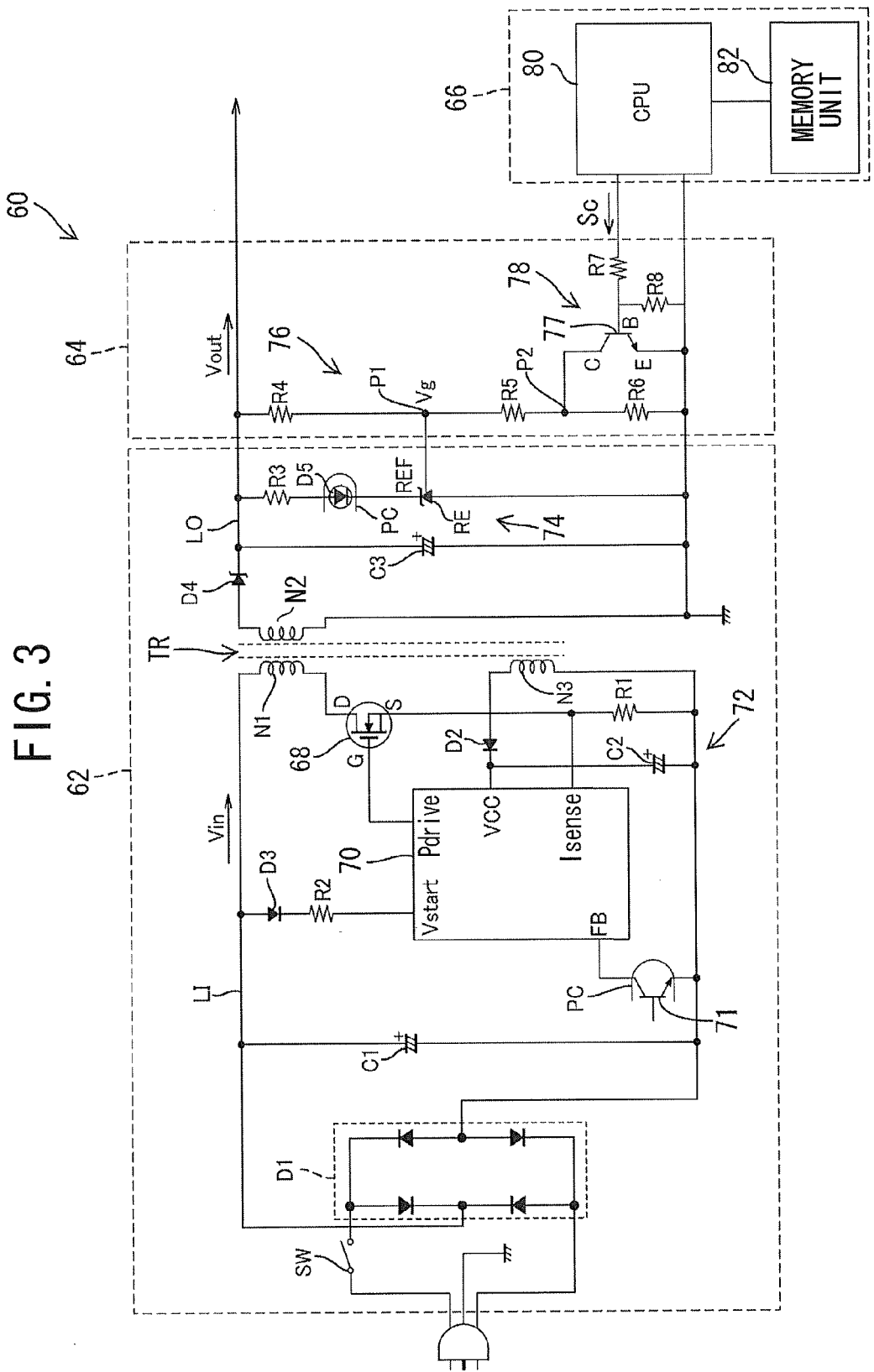
FIG. 3 is a circuitry diagram of a power supply.

FIG. 3 is a circuitry diagram of the power supply 60. The power supply 60 includes a voltage generation unit 62, a voltage conversion and output unit 64, and a control unit 66.

Control Unit

The control unit 66 includes the CPU 80, and a memory unit 82. The memory unit 82 stores various programs for controlling operations of the printer 10 and the like. The CPU 80 controls components of the printer 10 (indicated by dotted lines in FIG. 2) based on programs read from the memory unit 82 and switches the operating mode of the printer 10, as will be described later. The CPU 80 also outputs a control signal Sc to the voltage conversion and output unit 64 for changing the value of the output voltage $V_{out}$.

Voltage Generation Unit

The voltage generation unit 62 generates a DC voltage of prescribed magnitude from an AC voltage received from the AC power supply. The voltage generation unit 62 includes a transformer TR, a field-effect transistor (hereinafter "FET") 68, a photocoupler PC, and a control IC 70.

The voltage generation unit 62 also has a switching element SW for switching the AC voltage input on and off, a diode bridge rectifier D1 for rectifying the AC voltage inputted from the AC power supply, and a capacitor C1 for smoothing the rectified voltage. After the AC voltage is rectified and smoothed, the resulting input voltage $V_{in}$ is applied to a primary coil N1 of the transformer TR via an input line $L_I$.

The FET 68 is an N-channel MOSFET. The drain electrode D of the FET 68 is connected to the primary coil N1, while the source electrode S is grounded to the diode bridge rectifier D1 via a resistor R1. The gate terminal G on the FET 68 is connected to an output port $P_{Drive}$ on the control IC 70.

The control IC 70 outputs a PWM (pulse-width modulation) signal to the gate terminal G of the FET 68 via the output port $P_{Drive}$ for controlling ON/OFF operations of the FET 68. The PWM signal is an ON/OFF signal having a fixed period with an adjustable duty cycle indicating the duration in which the ON signal is outputted during each period. With this configuration, the control IC 70 oscillates the primary side of the transformer TR to induce voltage across a secondary coil N2 of the transformer TR, generating the output voltage $V_{out}$ in the output line $L_O$ connected to the secondary coil N2. The prescribed voltage is outputted both to the voltage conversion and output unit 64 via the output line $L_O$ and to each component in the printer 10.

A voltage-generating circuit 72 is provided on the primary side of the transformer TR. The voltage-generating circuit 72 includes a diode D2 and a capacitor C2 for smoothing the voltage induced across an auxiliary coil N3 provided on the primary side of the transformer TR. The voltage-generating circuit 72 is connected to a power supply port $V_{CC}$ of the control IC 70 and serves as the power source for the control IC 70.

In addition to the output port $P_{Drive}$ and the power supply port $V_{CC}$, the control IC 70 includes an input port $V_{start}$, an input port FB, and a current-sensing port $I_{sense}$. The input port $V_{start}$ is connected to the input line $L_I$ via a diode D3 and a resistor R2. The input port FB is connected to a transistor 71 and receives a feedback signal via the transistor 71. The current-sensing port $I_{sense}$ detects electric current outputted from the source electrode S of the FET 68.

On the secondary side of the transformer TR, the voltage generation unit 62 has a zener diode D4 for rectifying the voltage induced across the secondary coil N2 of the transformer TR, and a capacitor C3 for smoothing the rectified voltage. After the induced voltage is rectified and smoothed, the resulting output voltage $V_{out}$ is applied to a voltage-detecting circuit 74 via the output line $L_O$.

The voltage-detecting circuit 74 includes a resistor R3, a light-emitting diode D5, and a shunt regulator RE connected in series between the output line $L_O$ and ground. The shunt regulator RE has a reference voltage KV. A divided voltage Vg generated in the voltage conversion and output unit 64 from the output voltage $V_{out}$, as will be described later, is inputted into a reference terminal REF of the shunt regulator RE. The shunt regulator RE supplies a current corresponding to the voltage difference between the reference voltage KV and the divided voltage Vg. If this voltage difference grows larger than a threshold value, the shunt regulator RE connected in series with the light-emitting diode D5 applies a voltage to the light-emitting diode D5 that exceeds the ON resistance of the light-emitting diode D5, causing the light-emitting diode D5 to output an optical signal. Hence, the threshold value is set based on the ON resistor in the light-emitting diode D5.

The light-emitting diode D5 constitutes a photocoupler together with the transistor 71, which is connected to the input port FB of the control IC 70. Upon receiving an optical signal from the light-emitting diode D5, the transistor 71 converts the optical signal back to an electric signal. In this way, the transistor 71 can input a feedback signal into the input port FB of the control IC 70 indicating the voltage difference of the divided voltage Vg relative to the reference voltage KV.

When a feedback signal is inputted into the input port FB, the control IC 70 reduces the width of the ON signal in the PWM signal outputted to the gate terminal G of the FET 68, thereby reducing the ON duration of the FET 68 and suppressing voltage induced across the secondary coil N2 of the transformer TR. Reducing the value of the output voltage $V_{out}$ and the value of the divided voltage Vg reduces the voltage difference between the reference voltage KV and the divided voltage Vg. Once the voltage difference drops below the threshold value, the optical signal outputted from the light-emitting diode D5 is interrupted. Hence, the control IC 70 controls the value of the output voltage $V_{out}$ to bring the divided voltage Vg equivalent to the reference voltage KV.

Voltage Conversion and Output Unit

The voltage conversion and output unit 64 converts the output voltage $V_{out}$ generated by the voltage generation unit 62 to a voltage corresponding to the control signal Sc inputted from the control unit 66 and outputs the converted output voltage $V_{out}$ to components in the printer 10. Specifically, the control signal Sc is a PWM signal with an adjustable duty cycle. The voltage conversion and output unit 64 modifies the divided voltage Vg based on the duty cycle of the control signal Sc inputted from the control unit 66. Through this configuration, the output voltage $V_{out}$ generated in the voltage generation unit 62 is converted in the voltage conversion and output unit 64, and the converted output voltage $V_{out}$ is outputted to components in the printer 10.

The voltage conversion and output unit 64 includes a series circuit 76 having resistors R4-R6 connected in series, and a resistance-converting circuit 78 connected in parallel to the resistor R6 of the series circuit 76. The series circuit 76 has the resistors R4, R5, and R6 connected sequentially between the output line $L_O$ and ground. The divided voltage Vg is generated by the voltage at a contact point P1 between the resistors R4 and R5.

The resistance-converting circuit 78 is configured of a transistor 77, and resistors R7 and R8. The transistor 77 is an NPN transistor. The collector C of the transistor 77 is connected to a contact point P2 between the resistors R5 and R6. The emitter E of the transistor 77 is grounded. The base B of the transistor 77 is connected to the control unit 66 via the resistor R7. The resistor R8 is connected between the base B of the transistor 77 and ground.

When the control signal Sc is received from the control unit 66 via the resistor R7, the transistor 77 turns on for a duration corresponding to the duty cycle. When the transistor 77 is off, the resistance value of the series circuit 76 is equivalent to R4+R5+R6, and the resistance value between the contact point P1 and ground is R5+R6. When the transistor 77 is on, the ends of the resistor R6 are short-circuited by the transistor 77, converting the resistance value of the series circuit 76 to R4+R5 and producing a resistance value of R5 between the contact point P1 and ground. Accordingly, if the duty cycle of the control signal Sc is Q %, the following equations express a resistance value Rg between the contact point P1 and ground, a resistance value Rv of the series circuit 76, and the value of the output voltage $V_{out}$.

$$Rg=R5\times Q/100+(R5+R6)\times(1-Q/100)$$

$$=R5+(1-Q/100)\times R6$$

$$Rv=R4+Rg$$

$$Vout=Vg\times(Rv/Rg)=Vg\times(1+R4/Rg)$$

The resistance value Rv of the series circuit 76 is converted according to the duty cycle of the control signal Sc. Hence, the value of the output voltage $V_{out}$ is also converted according to the duty cycle of the control signal Sc. Further, since the control IC 70 controls the value of the output voltage $V_{out}$ so that the divided voltage Vg is equivalent to the reference voltage KV, the value of output voltage $V_{out}$ after this control is performed by the control IC 70 can be represented by the following equation.

$$Vout=KV\times(1+R4/Rg)$$

3. Printing Process

Next, a printing process performed on the printer 10 will be described with reference to FIGS. 4 and 5. The printing process is executed by the CPU 80 according to a prescribed program. FIG. 5 is a timing chart showing the value of the output voltage $V_{out}$ that the power supply 60 outputs during the printing process during each operating mode of the printer 10. FIG. 5 shows both the control values used by the CPU 80 to control the value of the output voltage $V_{out}$, and the actual measured value of the output voltage $V_{out}$ outputted to the output line $L_O$.

As shown in FIG. 5, operating modes of the printer 10 include a sleep mode M1, a print start mode M2, a print mode M3, and a ready mode M4. In the sleep mode M1, the printer 10 is waiting for a print command from the user. In the print mode M3, the printer 10 has received a print command and is forming images on sheets 16 based on this print command. In the print start mode M2, the printer 10 is shifting from the sleep mode M1 to the print mode M3. In the ready mode M4, the printer 10 is shifting from the print mode M3 to the sleep mode M1.

Figure 4:
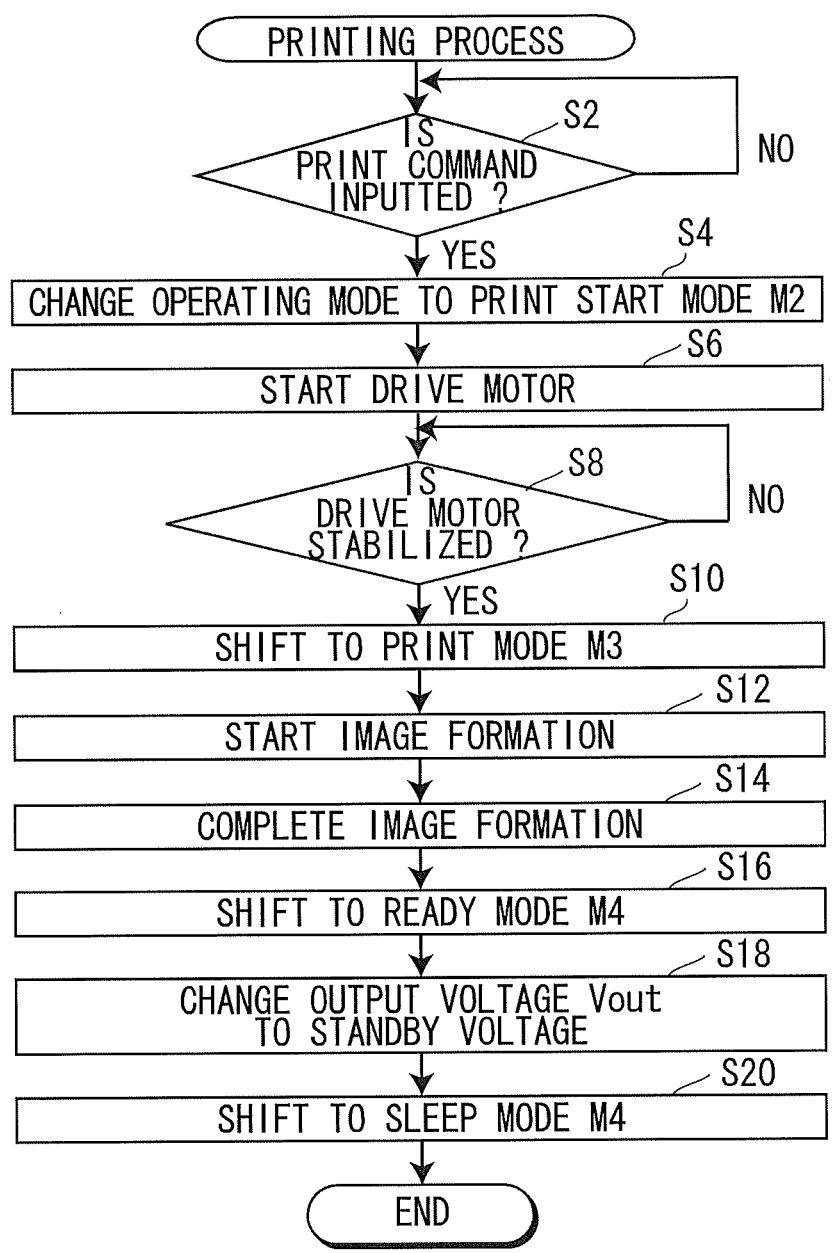
FIG. 4 is a flowchart illustrating steps in a printing process.
Figure 5:
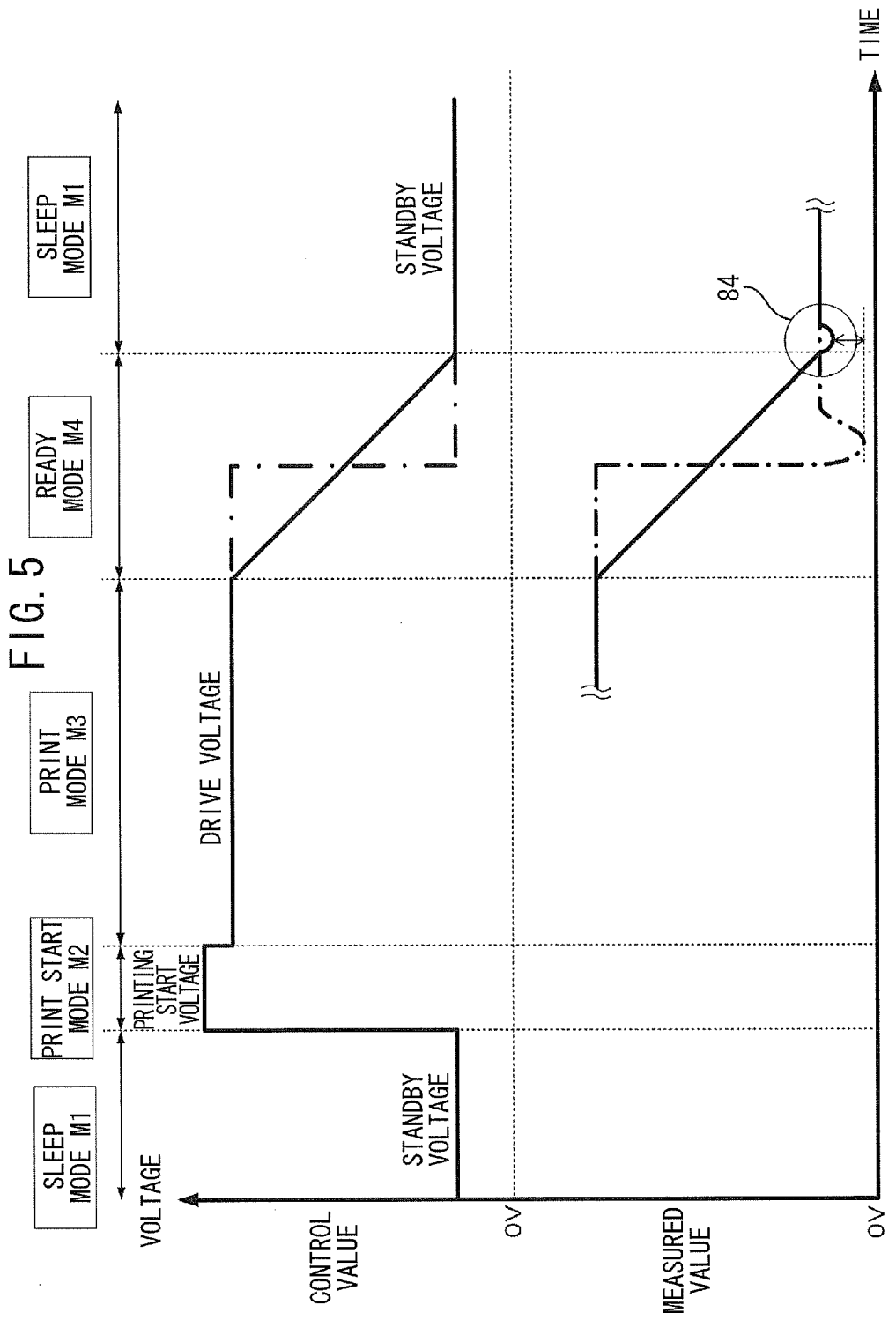
FIG. 5 is a timing chart showing a value of an output voltage that the power supply outputs during each operating mode of the printer according to the first embodiment.

In S2 at the beginning of the printing process of FIG. 4, the CPU 80 waits in the sleep mode M1 for a user-inputted print command, continuing to wait while no command has been inputted (S2: NO). While in the sleep mode M1, the CPU 80 outputs a control signal Sc to the voltage conversion and output unit 64 for setting the output voltage $V_{out}$ outputted from the power supply 60 to a standby voltage (5 V, for example). Specifically, the CPU 80 outputs a PWM signal to the voltage conversion and output unit 64 having a duty cycle for setting the output voltage $V_{out}$ to the standby voltage. The standby voltage is lower than a drive voltage for the print mode M3 described later (24 V, for example) and is aimed at reducing power consumption in the sleep mode M1.

When the user inputs a print command (S2: YES), in S4 the CPU 80 changes the operating mode of the printer 10 to the print start mode M2. In order to change the operating mode to the print start mode M2, the CPU 80 sets the output voltage $V_{out}$ to a printing start voltage (28 V, for example) that is higher than the drive voltage. When changing the output voltage $V_{out}$ from the standby voltage to the printing start voltage, the CPU 80 directly changes the duty cycle of the control signal Sc from a duty cycle Q1 corresponding to the standby voltage to a duty cycle Q2 corresponding to the printing start voltage, rather than changing to a duty cycle in between the Q1 and Q2. Here, the duty cycle Q2 is higher than the duty cycle Q1.

In S6 the drive motor 21 begins to start up when the output voltage $V_{out}$ is set to the printing start voltage. However, the solenoid 19 is not on during the print start mode M2 and, hence, images are not formed on sheets 16 during the print start mode M2. In S8 the CPU 80 monitors the rotating speed of the drive motor 21 and the like and continues to wait while the operation of the drive motor 21 has not stabilized (S8: NO). Once the operation of the drive motor 21 has stabilized (S8: YES), in S10 the CPU 80 shifts the operating mode of the printer 10 to the print mode M3 prior to beginning image formation on the sheets 16.

To shift the operating mode to the print mode M3, the CPU 80 sets the output voltage $V_{out}$ to the drive voltage, and in S12 starts the operation for forming images on the sheets 16. The CPU 80 switches the output voltage $V_{out}$ from the printing start voltage to the drive voltage by directly changing the duty cycle of the control signal Sc from the duty cycle Q2 corresponding to the printing start voltage to a duty cycle Q3 corresponding to the drive voltage larger than the standby voltage and smaller than the printing start voltage. Here, the duty cycle Q3 is higher than the duty cycle Q1 and lower than the duty cycle Q2.

In S14 the CPU 80 completes the image-forming operation on the sheets 16. After image formation is complete, in S16 the CPU 80 changes the operating mode of the printer 10 to the ready mode M4. In the ready mode M4, the CPU 80 changes the output voltage $V_{out}$ gradually and continuously from the drive voltage to the standby voltage. More specifically, the CPU 80 gradually changes the duty cycle of the control signal Sc from the duty cycle Q3 corresponding to the drive voltage to the duty cycle Q1 corresponding to the standby voltage, decreasing the duty cycle at a rate of 1 to a few percent per prescribed unit of time. In other words, the CPU 80 changes the output voltage $V_{out}$ to the standby voltage in the ready mode M4 by sequentially outputting control signals Sc with duty cycles indicating intermediate voltage values that gradually decrease between the drive voltage and the standby voltage, and subsequently outputting a control signal Sc having the duty cycle Q1 corresponding to the standby voltage. That is, the duty cycles in the ready mode M4 monotonically decrease from the duty cycle Q3 to the duty cycle Q1.

Hence, in S18 the CPU 80 continuously changes the output voltage $V_{out}$ until the output voltage $V_{out}$ reaches the standby voltage. In S20 the CPU 80 switches the operating mode of the printer 10 to the sleep mode M1, and subsequently ends the printing process.

4. Effects of the First Embodiment (1) When changing the output voltage $V_{out}$ from the drive voltage to the standby voltage, the power supply 60 in the embodiment outputs control signals Sc indicating intermediate voltage values between the drive voltage and standby voltage. As indicated by a chain line in FIG. 5, undershoot can occur when the output voltage $V_{out}$ is changed directly from the drive voltage to the standby voltage. Therefore, the power supply 60 of the embodiment temporarily changes the output voltage $V_{out}$ to intermediate voltage values to suppress the occurrence of undershoot, as indicated in the region 84 of FIG. 5.

(2) When changing the output voltage $V_{out}$ from the drive voltage to the standby voltage, the power supply 60 of the embodiment gradually and continuously changes (sets) the output voltage $V_{out}$. Accordingly, the output voltage $V_{out}$ is changed gently in order to effectively suppress the occurrence of undershoot.

(3) When changing the output voltage $V_{out}$ from the drive voltage to the standby voltage, the power supply 60 of the embodiment changes the output voltage $V_{out}$ using the PWM signal as a control signal. Hence, the output voltage $V_{out}$ can be changed to a desired voltage by changing the duty cycle of the control signal.

(4) When changing the output voltage $V_{out}$ from the drive voltage to the standby voltage, the power supply 60 of the embodiment changes the output voltage $V_{out}$ by varying the duty cycle of the control signal to modify the resistance value of the series circuit 76. Accordingly, the power supply 60 can easily change the output voltage $V_{out}$ to a desired value.

(5) When the printer 10 is in the ready mode M4, the power supply 60 of the embodiment changes the output voltage $V_{out}$ from the drive voltage to the standby voltage. Hence, the power supply 60 can suppress the occurrence of undershoot in the ready mode M4.

(6) To shift the operating mode of the printer 10 from the sleep mode M1 to the print start mode M2, the power supply 60 of the embodiment sets the output voltage $V_{out}$ to the printing start voltage, which is higher than the drive voltage. Generally, the magnitude of current flowing in the drive motor 21 at startup can be suppressed when applying a larger output voltage $V_{out}$, thereby suppressing power consumption during startup of the drive motor 21. In the print start mode M2 coinciding with the startup of the drive motor 21, the output voltage $V_{out}$ in the embodiment is set to the printing start voltage, which is higher than the drive voltage, thereby suppressing power consumption during startup.

Second Embodiment

Figure 6:
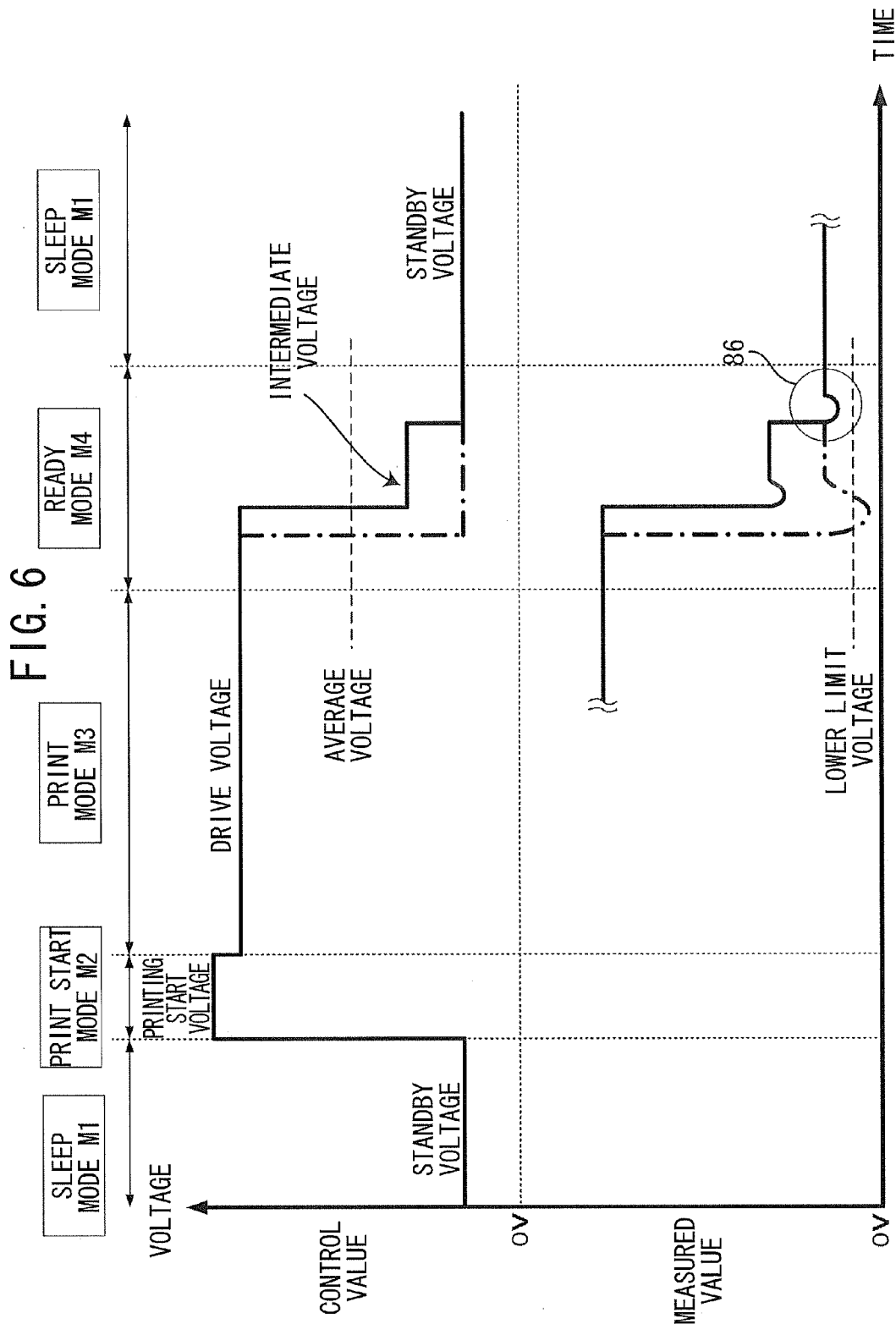
FIG. 6 is a timing chart showing a value of an output voltage that the power supply outputs during each operating mode of the printer according to a second embodiment.

Next, a second embodiment of the present invention will be described with reference to FIG. 6. The second embodiment differs from the first embodiment in the method of changing the output voltage $V_{out}$ from the drive voltage to the standby voltage when the printer 10 is in the ready mode M4. Aspects of the second embodiment that are identical to those described in the first embodiment will not be repeated in the following description.

1. Modifying the Output Voltage in the Ready Mode

In the ready mode M4 of the second embodiment, the CPU 80 changes (sets) the output voltage $V_{out}$ from the drive voltage to the standby voltage using one intermediate voltage having a value between the drive voltage and standby voltage. More specifically, the CPU 80 outputs an intermediate duty cycle Q4 between the duty cycle Q3 corresponding to the drive voltage and the duty cycle Q1 corresponding to the standby voltage as the duty cycle for the control signal Sc. Hence, when changing the output voltage $V_{out}$ from the drive voltage to the standby voltage, the CPU 80 first changes (sets) the output voltage $V_{out}$ from the drive voltage to the intermediate voltage, and subsequently changes the output voltage $V_{out}$ from the intermediate voltage to the standby voltage.

The intermediate voltage is set to a value closer to the standby voltage than the drive voltage, that is, to a value lower than the average of the drive voltage and standby voltage. Alternatively, the intermediate voltage may be calculated using the drive voltage and the standby voltage, or may be selected from a plurality of candidates stored in the memory unit 82.

2. Effects of the Second Embodiment

When switching the output voltage $V_{out}$ from the drive voltage to the standby voltage, the power supply 60 according to the second embodiment first changes (sets) the output voltage $V_{out}$ from the drive voltage to an intermediate voltage, and subsequently changes (sets) the output voltage $V_{out}$ from the intermediate voltage to the standby voltage. Further, the intermediate voltage is set to a value biased toward the standby voltage. In this way, the power supply 60 can suppress the occurrence of undershoot when the output voltage $V_{out}$ is changed to the standby voltage, as illustrated in the region 86 of FIG. 6, better than when changing the output voltage $V_{out}$ directly from the drive voltage to the standby voltage, as illustrated by the chain line in FIG. 6.

A device such as the DC-DC converter 56 has a preset lower limit for an operating voltage, such as 3.3 V. This type of device can produce undershoot during conversion, even when the control value for the standby voltage is set to a higher value than the lower limit. Thus, operations are halted when the actual value of the output voltage $V_{out}$ drops below the lower limit, as indicated by the chain line in FIG. 6.

The power supply 60 according to the second embodiment suppresses undershoot when switching to the standby voltage. Hence, even if the standby voltage is set near the lower limit, the actual value of the output voltage $V_{out}$ can be prevented from dropping below the lower limit as a result of undershoot. Accordingly, the standby voltage can be set lower than in the conventional devices.

Third Embodiment

Figure 7:
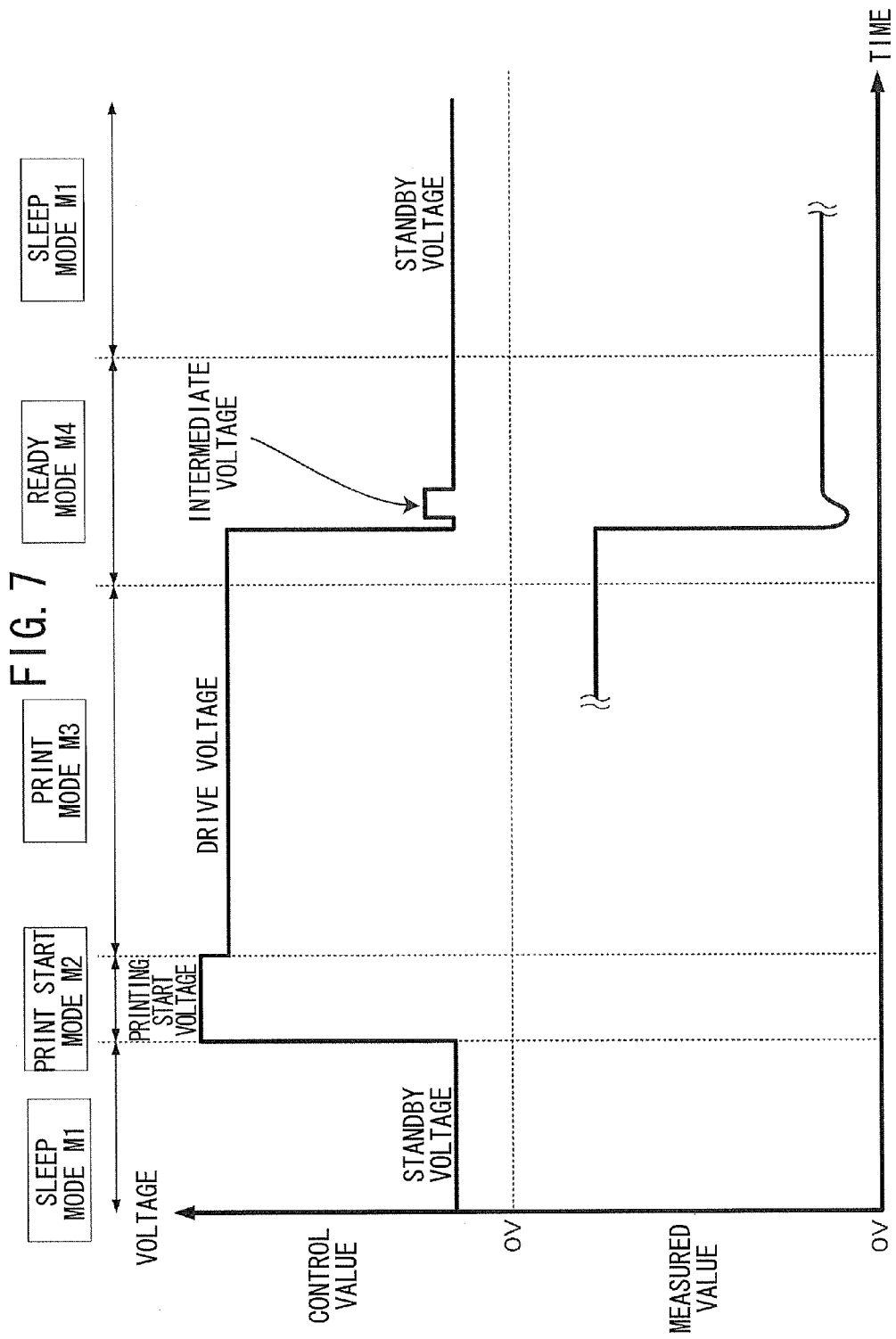
FIG. 7 is a timing chart showing a value of an output voltage that the power supply outputs during each operating mode of the printer according to a third embodiment.

Next, a third embodiment of the present invention will be described with reference to FIG. 7. The third embodiment differs from the first and second embodiments in the method of changing the output voltage $V_{out}$ from the drive voltage to the standby voltage while the printer 10 is in the ready mode M4. Aspects of the third embodiment that are identical to those described in the first embodiment will not be repeated in the following description.

1. Modifying the Output Voltage in the Ready Mode

In the ready mode M4 of the third embodiment, the CPU 80 changes (sets) the output voltage $V_{out}$ from the drive voltage to the standby voltage using one intermediate voltage having a value between the drive voltage and the standby voltage. More specifically, the CPU 80 outputs an intermediate duty cycle Q4 between the duty cycle Q3 corresponding to the drive voltage and the duty cycle Q1 corresponding to the standby voltage as the duty cycle for the control signal Sc. Specifically, the CPU 80 outputs the duty cycles Q3, Q1, and Q4 in this order. Hence, when changing the output voltage $V_{out}$ from the drive voltage to the standby voltage, the CPU 80 first changes (sets) the output voltage $V_{out}$ from the drive voltage to the standby voltage, then changes (sets) the output voltage $V_{out}$ from the standby voltage to the intermediate voltage, and finally changes (sets) the output voltage $V_{out}$ from the intermediate voltage to the standby voltage.

The timing for switching the output voltage $V_{out}$ from the standby voltage to the intermediate voltage is predetermined. For example, the timing for this change may be set to coincide with the occurrence of undershoot after the output voltage $V_{out}$ has been changed from the drive voltage to the standby voltage.

2. Effects of the Third Embodiment

When switching the output voltage $V_{out}$ from the drive voltage to the standby voltage, the power supply 60 according to the third embodiment first changes (sets) the output voltage $V_{out}$ from the drive voltage to the standby voltage, then changes (sets) the output voltage $V_{out}$ from the standby voltage to the intermediate voltage, and finally switches (sets) the output voltage $V_{out}$ from the intermediate voltage back to the standby voltage. Accordingly, the power supply 60 can suppress the occurrence of undershoot generated when the output voltage $V_{out}$ is changed directly from the drive voltage to the standby voltage by temporarily changing (setting) the output voltage $V_{out}$ to an intermediate voltage on the drive voltage side of the target voltage.

Variations of the Embodiments

While the invention has been described in detail with reference to specific embodiments thereof, it would be apparent to those skilled in the art that many modifications and variations may be made therein without departing from the scope of the invention.

(1) In the embodiments described above, the present invention is applied to a device having a printer function, but the present invention is not limited to devices with printer functions, provided that the device includes a power supply 60 for changing the output voltage among a plurality of values.

(2) In the embodiments, the printer 10 has a single CPU 80 for executing the various control processes and other processes. However, these processes may be shared among discrete CPUs, ASICs, and other devices, for example.

(3) The programs executed by the CPU 80 need not be stored in the memory unit 82, but may be stored in the CPU 80 itself or in another storage device.

(4) In the embodiments described above, the standby voltage serves as the target voltage, while the drive voltage serves as the starting voltage, but the starting voltage and target voltage may be set to other values. For example, when switching from the printing start voltage to the drive voltage, the output voltage $V_{out}$ may be switched to an intermediate voltage set to a value between the printing start voltage and drive voltage.

(5) In the embodiments, the starting voltage is set to a higher value than the target voltage, but the present invention is not limited to this configuration. For example, the invention can suppress the occurrence of overshoot by setting the starting voltage to a value lower than the target voltage and setting the intermediate voltage between the starting voltage and the target voltage.

Figure 8:
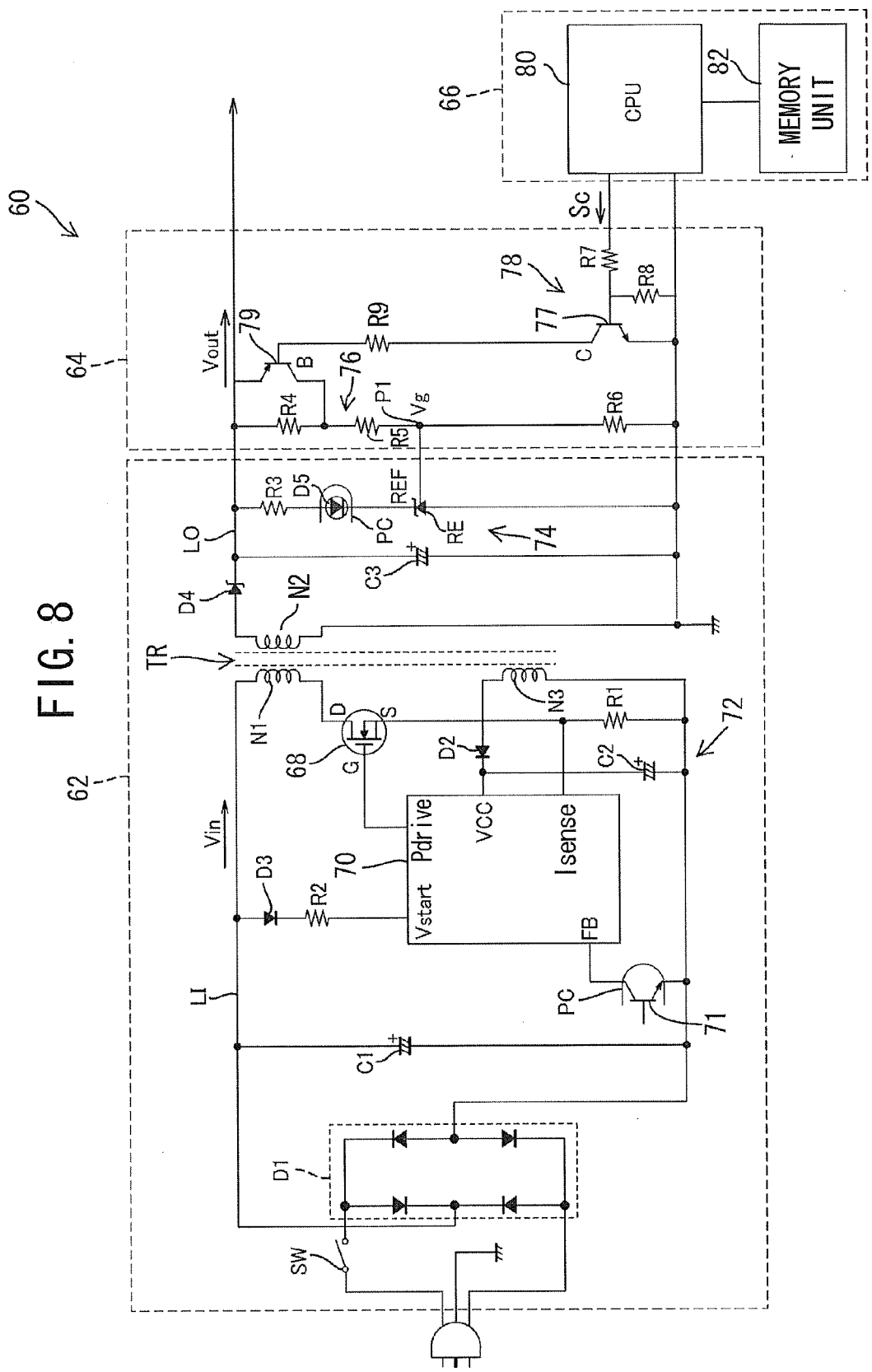
FIG. 8 is a circuitry diagram of a power supply according to a variation.

(6) The power supply 60 described in the embodiments may have other configurations and is not limited to the configuration of the above embodiments. For example, the power supply 60 may be provided with a voltage conversion and output unit 64 configured as shown in FIG. 8. In the voltage conversion and output unit 64 of FIG. 8, the resistance-converting circuit 78 has a transistor 79 that is connected in parallel to the resistor R4 of the series circuit 76. The transistor 79 is a PNP transistor. The base B of the transistor 79 is connected to the collector C of the transistor 77 via a resistor R9. With this configuration, the control signal Sc outputted from the control unit 66 changes the ON/OFF states of the transistors 77 and 79, and the resistance value Rv of the series circuit 76 is converted according to the duty cycle of the control signal Sc.

(7) In the third embodiment described above, the timing for switching the output voltage $V_{out}$ from the standby voltage to the intermediate voltage is preset, but the timing may be set based on the drive voltage and the standby voltage corresponding to the starting voltage and target voltage, respectively. Alternatively, the timing may be determined based on the actual measured value of undershoot generated when the drive voltage is changed to the standby voltage without setting the intermediate voltage.

(8) In the embodiments, the printer 10 is a monochrome printer. However, the printer 10 may be a color printer, such as, tandem type.

What is claimed is:

1. A power supply device comprising:
   a first voltage generating unit configured to generate a first voltage;
   a controller configured to output a control signal specifying a voltage value; and
   a voltage conversion unit configured to convert the first voltage to a second voltage in response to a control signal specifying a voltage value output from the controller, and output the second voltage,
   wherein the voltage conversion unit converts the first voltage to a start voltage, as the second voltage, in response to a first control signal specifying a start voltage value output from the controller and further converts the first voltage to a target voltage, as the second voltage, in response to a second control signal specifying a target voltage value output from the controller,
   wherein a transition period of time is intervened between generation of the start voltage and generation of the target voltage during which the controller outputs a third control signal specifying the intermediate voltage value between the start voltage value and the target voltage value.

2. The power supply device according to claim 1, wherein the controller sequentially outputs control signals specifying voltage values that continuously vary from the start voltage value to the target voltage value in the transition period of time.

3. The power supply device according to claim 1, wherein the intermediate voltage value is closer to the target voltage value than an average of the start voltage value and the target voltage value.

4. The power supply device according to claim 1, wherein the controller outputs the first control signal specifying the start voltage value, the third control signal specifying the intermediate voltage value, and a second control signal specifying the target voltage value in said order in the transition period of time.

5. The power supply device according to claim 1, wherein the control signal includes a PWM signal having a duty cycle corresponding to the value of the voltage,
   wherein the voltage conversion unit converts the first voltage to the second voltage based on the duty cycle and outputs the second voltage.

6. The power supply device according to claim 5, wherein the voltage conversion unit includes:
   a resistor portion having a resistance value; and
   a resistance changing unit configured to change the resistance value of the resistor portion based on the duty cycle.

7. The power supply device according to claim 1, wherein the voltage conversion unit comprises:
   a transformer including a primary side and a secondary side, and configured to induce an induced voltage across the secondary side when the primary side is oscillated;
   a switching element connected to the primary side;
   an output line connected to the secondary side, and configured to output the second voltage;
   a voltage detecting unit configured to detect a determination voltage generated from the second voltage and determine whether a voltage difference between a reference voltage and the determination voltage is larger than a threshold value; and
   a switch controller configured to control the switching element to reduce the voltage difference when the voltage difference is larger than the threshold value.

8. The power supply device according to claim 1, wherein the controller sequentially outputs control signals specifying values of the voltage that gradually vary from the start voltage value to the target voltage value.

* * * * *